United States Patent [19]
Karam

[11] Patent Number: 5,903,085
[45] Date of Patent: May 11, 1999

[54] PIEZOELECTRIC NANOPOSITIONER

[75] Inventor: Raymond Karam, Santa Barbara, Calif.

[73] Assignee: Phase Metrics, Inc., San Diego, Calif.

[21] Appl. No.: 08/878,236

[22] Filed: Jun. 18, 1997

[51] Int. Cl.[6] .................................................. H01L 41/08
[52] U.S. Cl. ................................................... 310/328
[58] Field of Search .................................. 310/328, 323, 310/316; 360/31, 78.12, 109

[56]     References Cited

U.S. PATENT DOCUMENTS

| | | | |
|---|---|---|---|
| 3,891,869 | 6/1975 | Scarpa | 310/323 |
| 4,087,715 | 5/1978 | Myer | 310/317 |
| 4,506,154 | 3/1985 | Scire | 250/442.1 |
| 4,613,782 | 9/1986 | Mori et al. | 310/328 |
| 4,644,213 | 2/1987 | Shibuya | 310/328 |
| 4,694,477 | 9/1987 | Siddall | 378/34 |
| 4,727,278 | 2/1988 | Staufenberg, Jr. | 310/328 |
| 4,835,434 | 5/1989 | Marth | 310/328 |
| 4,874,978 | 10/1989 | Sakaida et al. | 310/328 |
| 4,886,382 | 12/1989 | Oota et al. | 310/328 X |
| 4,976,553 | 12/1990 | Yamaguchi et al. | 310/328 X |
| 4,986,150 | 1/1991 | Okazaki | 82/137 |
| 5,015,850 | 5/1991 | Zdeblick et al. | 250/306 |
| 5,191,252 | 3/1993 | Sano | 310/328 |
| 5,351,412 | 10/1994 | Furuhata et al. | 33/568 |
| 5,465,021 | 11/1995 | Visscher et al. | 310/328 |
| 5,489,812 | 2/1996 | Furuhata et al. | 310/309 |
| 5,604,413 | 2/1997 | Khorrami et al. | 318/632 |
| 5,712,524 | 1/1998 | Suga | 310/328 |

FOREIGN PATENT DOCUMENTS

| | | | |
|---|---|---|---|
| 0213484 | 12/1983 | Japan | 310/328 |
| 0106983 | 4/1990 | Japan | 310/328 |

*Primary Examiner*—Mark O. Budd
*Attorney, Agent, or Firm*—Blakely Sokoloff; Taylor & Zafman

[57]     ABSTRACT

A positioner which can move an object such as a magnetic recording head. The positioner includes a housing with an inner opening. The housing is located within a coordinate system that includes an x axis, a y axis and a z axis. An electrical/mechanical transducer is coupled to the inner opening of the housing by at least two flexure joint inserts. Expansion or contraction of the transducer creates a movement of the housing along the x or y axis. The flexure joint inserts allow the transducer to be adjusted within the inner opening during assembly to minimize the out of plane movement of the housing along the z axis.

6 Claims, 4 Drawing Sheets

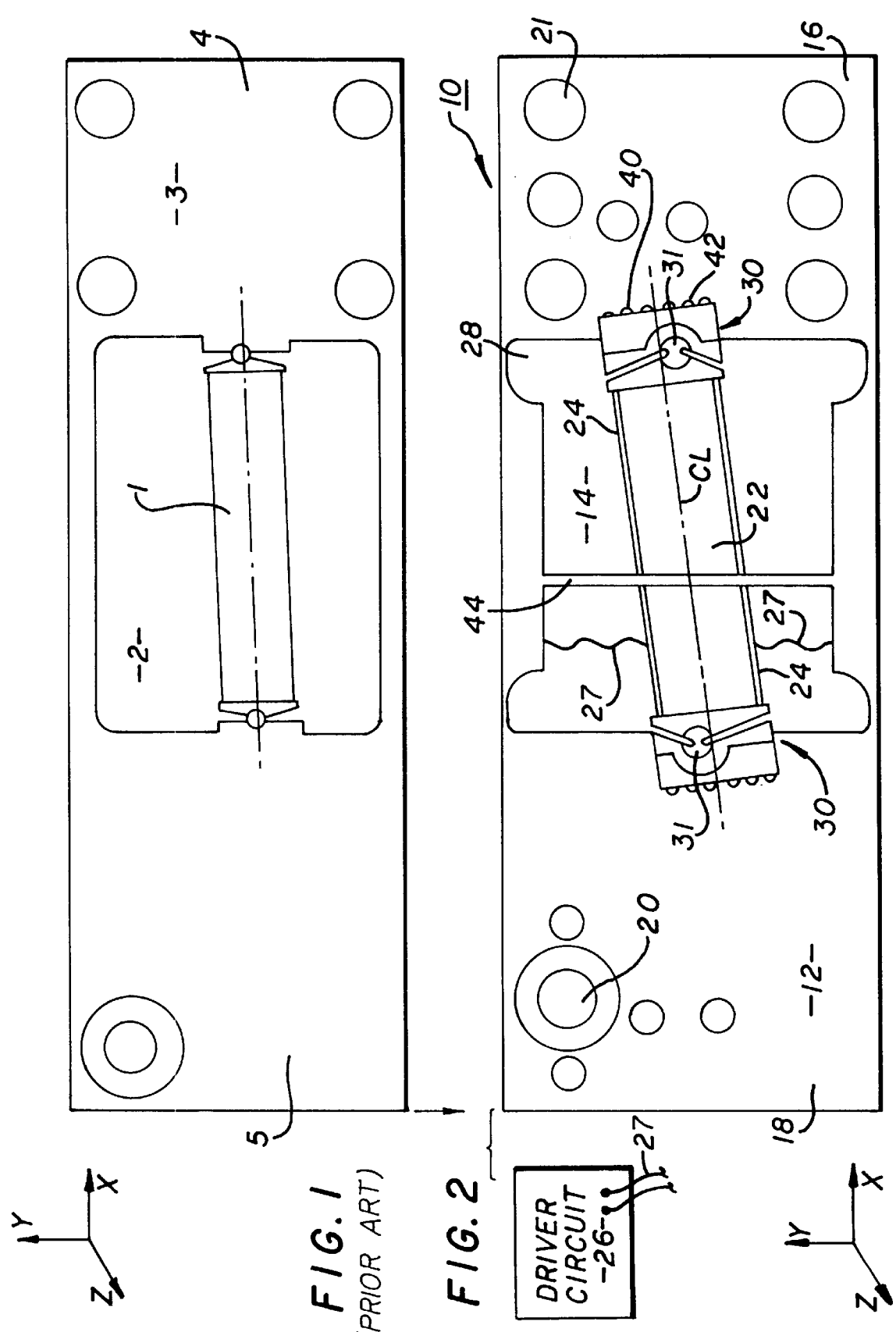

PIEZOELECTRIC NANOPOSITIONER

BACKGROUND OF THE INVENTION

1. Field of the Invention

The present invention relates to a positioner that can move an object such as a magnetic recording head, or the probe of an atomic microscope.

2. Description of Related Art

Hard disk drives contain a plurality of magnetic recording heads that write and read information from a number of adjacent rotating magnetic disks. There is typically a recording head associated with each surface of a disk. The magnetic heads write and read data by magnetizing and then sensing the magnetic field of the disks. Each recording head has an air bearing surface which cooperates with an airflow created by the rotating disk to form an air bearing. The air bearing separates the recording head from the disk surface to prevent mechanical wear. The air bearing also reduces the magnetic coupling between the head and the disk. It is desirable to minimize the height of the air bearing without inducing undesirable contact between the two components.

Each magnetic recording head is typically mounted to a gimbal of a flexure arm. Each flexure arm is attached to an actuator which has a voice coil motor. The voice coil motor can be actuated to move the heads across the surfaces of the disks to access different tracks of data. The flexure arm, gimbal and head are commonly referred to as a head-gimbal assembly (HGA). The HGA is designed to create an optimum air bearing for the recording head.

There have been developed various types of recording heads such as ferrite, thin film and magnetoresistive (MR) heads. MR heads typically have an element for magnetizing the disk (writing data) and a separate magnetoresistive element for sensing the magnetic field of the disk (reading data). As a result of manufacturing processes the MR element may be spatially offset from the write element. It is desirable to measure the offset between the two elements so that the disk drive controller can be programmed to compensate for the deviation between the read and write elements.

Recording heads are typically measured in a dynamic head tester. Dynamic head testers include a rotating magnetic disk and a fixture that can support either an HGA or an individual head. The fixture is coupled to a course positioner which moves the head adjacent to the rotating magnetic disk. The tester contains test circuitry which is coupled to the head and performs various routines to test various dynamic electrical characteristics of the head. The tester may contain a fine positioner which can move the head over very small increments to obtain test data such as the offset of an MR head. The movement by the fine positioner can be on the order of nanometers.

Some of the dynamic values measured by the tester are stored in the memory of the disk drive in which the head is assembled. It is desirable to obtain accurate dynamic values to assure a proper optimum functioning of the drive. It is therefore imperative that the fine positioner accurately move the heads during test.

Many disk drive manufacturers test every recording head before assembly into a hard disk drive. The dynamic testing therefore becomes a manufacturing step of the drive. A reduction in the time that it takes to test each recording head can save millions of dollars for the manufacturer. The test time includes a mechanical settling time for the positioner each time the head is moved relative to the disk. It would be desirable to provide a fine positioner which has a very fine resolution and relatively low settling time.

FIG. 1 shows a nanopositioner of the prior art sold by Piezosystem Jena of Germany. The Jena positioner has a piezoelectric transducer 1 that is located within an opening 2 of the positioner housing 3. One end 4 of the housing 3 is mounted to a substrate and fixed in space. A fixture (not shown) is typically mounted to the other end 5 of the housing. The application of a voltage across the transducer 1 will cause the piezoelectric material to expand and move the free end 5 of the housing along the y axis.

To provide a highly accurate positioner it is desirable to eliminate any movement of the housing free end 5 along the z axis, also referred to as out of plane movement. The Jena positioner creates an out of plane movement in the range of 80 nanometers when the free end 5 moves 100 microns. It would be desirable to provide a nanopositioner that creates less out plane movement than positioners of the prior art.

SUMMARY OF THE INVENTION

The present invention is a positioner which can move an object such as a magnetic recording head. The positioner includes a housing with an inner opening. The housing is located within a coordinate system that includes an x axis, a y axis and a z axis. An electrical/mechanical transducer is coupled to the inner opening of the housing by at least two flexure joint inserts. Expansion or contraction of the transducer creates a movement of the housing along the x or y axis. The flexure joint inserts allow the transducer to be adjusted within the inner opening during assembly to minimize the out of plane movement of the housing along the z axis.

BRIEF DESCRIPTION OF THE DRAWINGS

FIG. 1 is a top view of a positioner of the prior art;

FIG. 2 is a top view of a positioner of the present invention;

DETAILED DESCRIPTION OF THE INVENTION

Figure 3:
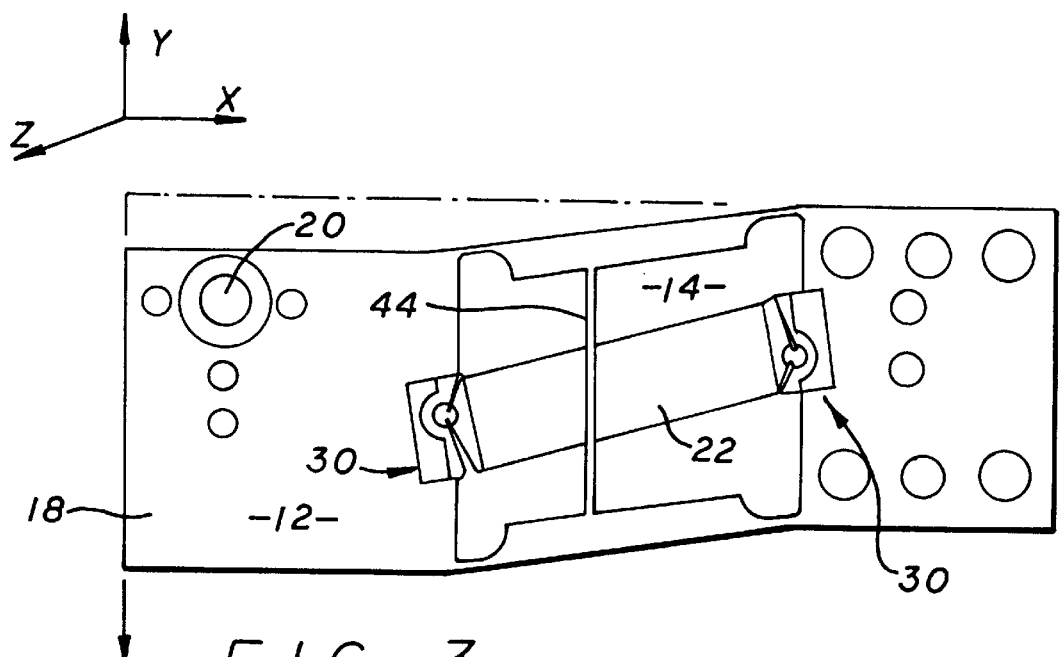
FIG. 3 is a top view of the positioner in a deflected position.

The present invention is a positioner that can move an object such as a magnetic recording head located within a dynamic head tester, or a probe of an atomic force microscope. The positioner includes an electrical/mechanical transducer that is mounted to an inner opening of a housing. The transducer may be piezoelectric, an electrostrictive ceramic actuator, quartz, magnetostrictive or any magnetic device that can expand and contract. The end of the housing is coupled to the object and located within a coordinate system that has an x axis, a y axis and a z axis. The transducer will expand or contract when subjected to an electric field. The axis of expansion/contraction of the transducer is at an angle oblique to the x axis. Any expansion/contraction of the transducer creates a force-moment that moves the end of the housing along the y axis.

The transducer is mounted to the inner opening of the housing by at least two flexure joint inserts. The inserts allow the transducer to be positioned within the opening to create the least amount of housing movement along the z axis. By way of example, the positioner can move 200 microns while only creating 1–3 nanometers of movement in the out of plane z axis. Additionally, the positioner can be moved, and settled for use in a dynamic head tester, 2.5 microns in less than 5 milliseconds. Although a dynamic head tester is described, it is to be understood that the positioner can be used in any device, structure or assembly that requires mechanical movement. By way of example, the positioner can be used in equipment that performs lithographic processes for creating and inspecting integrated circuits, integrated circuit masks, etc., or to move the probe of an atomic force microscope and other like devices.

Referring to the drawings more particularly by reference numbers, FIG. 2 shows a positioner 10 of the present invention. The positioner 10 includes a housing 12 that has an inner opening 14. The housing 12 typically has a proximal end 16 that is fixed in spaced and a distal end 18 that can move. The distal end 18 is located in a coordinate system which has an x axis, a y axis and a z axis. The distal end 18 may have a mounting hole 20 that allows a magnetic recording head test fixture (not shown) or other device to be mounted to the housing 12. The proximal end 16 may have mounting holes 21 that are used to attach the positioner to a rigid structure.

An electrical/mechanical transducer 22 is mounted to the housing 12 within the inner opening 14. The electrical/mechanical transducer 22 may be a piezoelectric device or an electrostrictive device that have a pair of electrodes 24 which are attached to an external driver circuit 26 by wires 27. The driver circuit 26 provides an electric field to the transducer 22 which causes the device to either expand or contract. The expansion or contraction occurs along the longitudinal axis $C_L$ of the transducer. The longitudinal axis is located at an angle oblique to the x axis.

As shown in FIG. 3, expansion or contraction of the transducer 22 will create a moment that deflects the housing along the y axis. As one embodiment, the housing 12 and opening 14 form a parallelpiped that is deflected by the force-moment created by the expanded transducer 22. The housing 12 may have inner notches 28 at the four corners of the opening 14 which reduce the stiffness and create hinges for the positioner.

The electrical/mechanical transducer 22 is coupled to the housing 12 by a pair of flexure joint inserts 30. As shown in FIG. 3, the flexure joint inserts 30 allow the transducer 22 to pivot about the housing 12 when the positioner 10 is actuated. The flexure joints 30 reduce the mechanical strain of the transducer 22.

The flexure joint inserts 30 each have a pivot point 31 that is offset from the longitudinal axis of the transducer 22. The offset pivot points 31 create greater movement of the housing 12 for a given incremental expansion/contraction of the transducer 22. The offset pivot points 31 extend the range of positioner. For example, nanopositioners of the prior art typically move up to 100 microns. The positioner of the present invention can move up to 200 microns.

Figure 5:
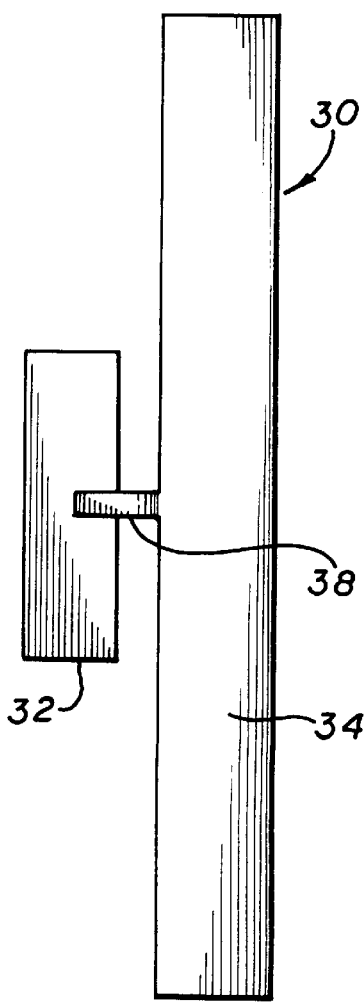
FIG. 5 is a side elevational view of the flexure joint shown in FIG. 4.
Figure 4:
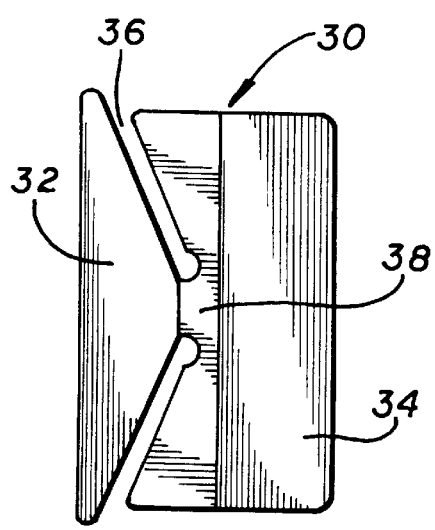
FIG. 4 is a top plane view of a flexure joint.

As shown in FIGS. 4 and 5, each flexure joint 30 includes a coupling portion 32 that is separated from a base portion 34 by a pair of slits 36. The coupling portion 32 is attached to the transducer 22. The base portion 34 is attached to the housing 12. The coupling portion 32 is adjoined to the base portion 34 by a gimbal 38. The gimbal 38 allows the transducer 22 to pivot about the housing 12.

The housing 12 may be constructed from an aluminum material. The flexure joints 30 may be constructed from a steel material. It has been found that this combination provides a positioner structure which has a relatively low resonant frequency. The housing thus quickly dampens when actuated, thereby providing a relatively small settling time. The small settling time increases the speed of the positioner 10. The steel inserts 30 also provide relatively high yield strengths and life cycles so that the positioner can be repeatedly actuated without failing the gimbals 38. Although steel flexure joint inserts 30 are described, it is to be understood that the inserts 30 can be constructed from other materials such as aluminum.

Figure 6A:
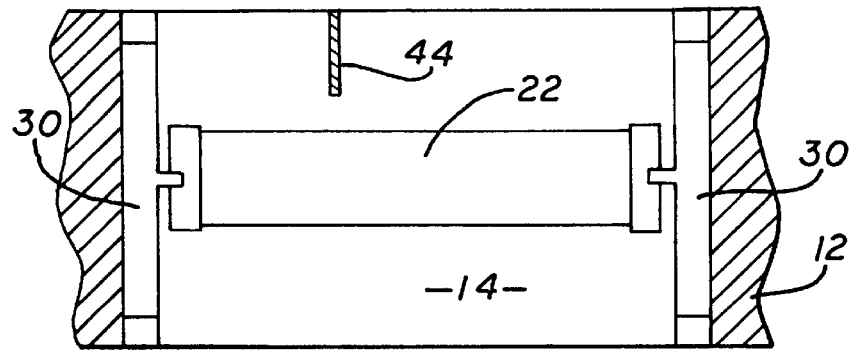
FIGS. 6a is a cross-sectional view showing a transducer and a pair of flexure joint inserts placed into the opening of the positioner housing.
Figure 6B:
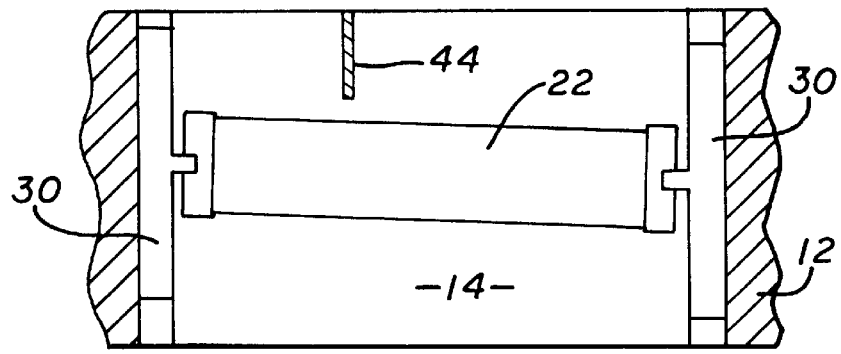
FIG. 6b is a cross-sectional view similar to FIG. 6a showing one of the flexure joint inserts moved within the opening.

FIGS. 6a and 6b show a method for assembling the transducer 22 to the housing 12. The transducer 22 is initially attached to the flexure joint inserts 30 as a separate subassembly. The transducer subassembly is then inserted into the opening 14. An electric field is applied to the transducer 22 and the amount of housing movement is measured.

As shown in FIG. 6b one of the flexure joint inserts 30 is then moved within the opening 14. The gimbal 38 of the insert 30 allows the transducer 22 to pivot within the opening 14. An electric field is again applied to the transducer 22 and the housing movement is measured. The process of moving one of the flexure joint inserts 30, applying an electric field to the transducer 22 and measuring the housing movement is repeated for a number of insert 30 positions. The data is then analyzed to determine the position of the inserts 30 which creates the least amount of z axis movement.

Referring to FIG. 2, an adhesive 40 may be injected into a plurality of housing grooves 42 to attach the flexure joint inserts 30 and transducer 22 to the housing 14. Although movement of one insert 30 during the assembly process is shown and described, it is to be understood that both inserts 30 may be moved between each cycle of exciting the transducer 22 and measuring the housing movement. The flexure joint inserts 30 allow the transducer 22 to be moved within the opening to provide a position which creates the least amount of z axis movement of the distal housing end 18.

The housing 12 preferably has a torsional cross-bar 44 that increases the torsional stiffness of the housing 12. The increased torsional stiffness reduces the out of plane z axis movement when an electric field is applied to the transducer 22.

Figure 7:
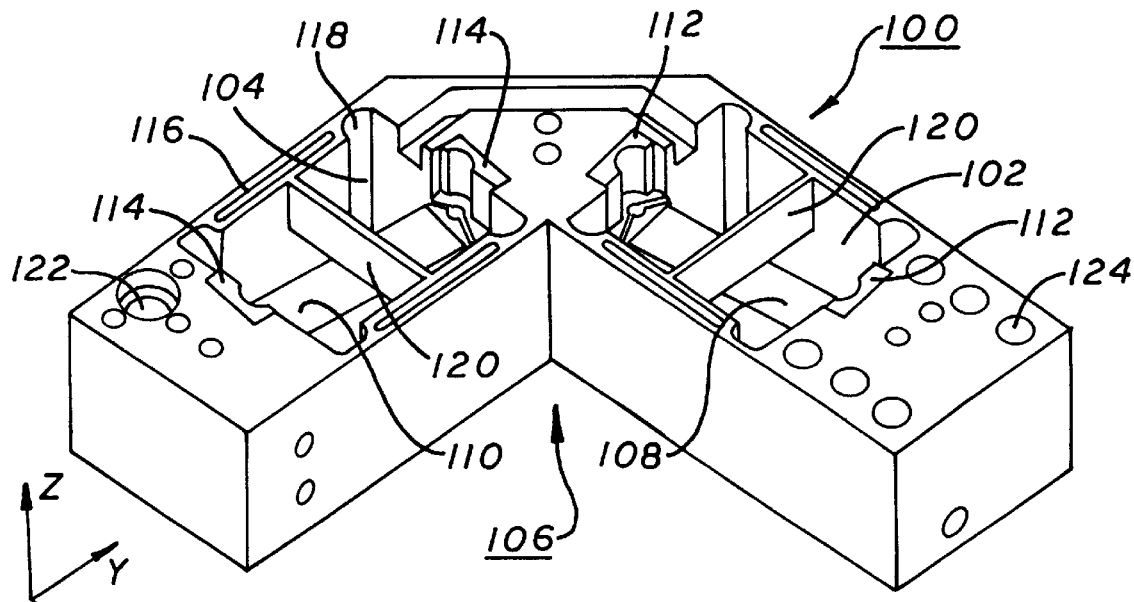
FIG. 7 is an alternate embodiment of the positioner.

FIG. 7 shows an alternate embodiment of a positioner 100 that can move an object in two directions. The positioner 100 has two inner openings 102 and 104 in a housing 106. Each opening 102 and 104 contains an electrical/mechanical transducer 108 and 110, respectively. The transducers 108 and 110 can be coupled to the housing 106 by flexure joint inserts 112 and 114. The transducers 108 and 110 are coupled to a driver circuit(s) (not shown) that induces an expansion or contraction of the devices.

Each transducer stage can be formed as a parallelpiped which is deflected by the transducers 108 and 110, respectively. The housing 106 may have inner slits 116 and notches 118 that reduce the stiffness and provide hinge joints for the positioner 100. Although it is to be understood that the positioner 100 may be utilized without the slits 116 or the notches 118. The housing 106 may also have torsion crossbars 120 within each opening 102 and 104.

The distal end of the housing 106 may have a mounting hole 122 that allows an object such as a microscope probe or test fixture to be attached to the positioner. The distal end is located within a coordinate system which has an x axis, a y axis and a z axis. The proximal end may also have a mounting hole(s) 124 to attach the positioner to a rigid structure.

An expansion/contraction of transducer 108 will create a moment that causes a movement of the housing distal end along the y axis. An expansion/contraction of the transducer 110 will create a moment that causes a movement of the housing distal end along the x axis. The transducers 108 and 110 are preferably assembled with the method shown in FIGS. 6a and 6b to find a transducer position that creates the least amount of out of plane z axis movement.

Figure 8:
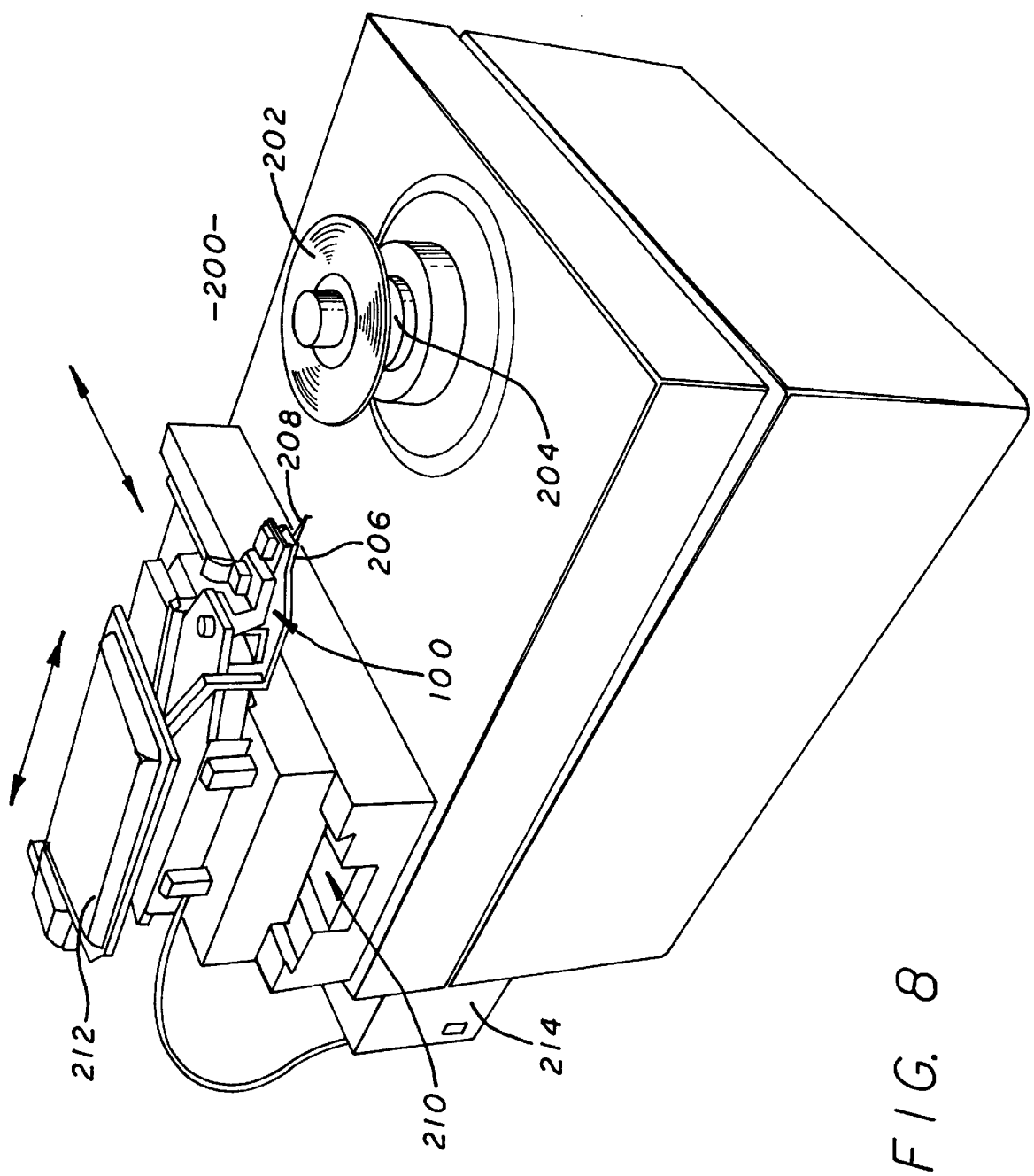
FIG. 8 is a perspective view of a magnetic recording head dynamic tester with the positioner of the present invention.

FIG. 8 shows positioner 100 within a tester 200 which can provide dynamic electrical testing of a magnetic recording head. The tester 200 includes a magnetic disk 202 that is rotated by a spindle 204. The tester 200 further includes a fixture 206 that can support a head gimbal assembly (HGA) 208. Although an HGA fixture is shown and described, it is to be understood that a fixture which supports an individual recording head can be attached to the tester 200.

The fixture 206 is attached to the distal end of the positioner 100. The positioner 100 is mounted to an x-y table 210 which provides course movement of the HGA 208. The tester 200 includes driver/tester circuits 212 that can drive the x-y table 210 and the positioner 100. The driver/tester circuit 212 is coupled to a computer 214 and the magnetic recording head of the HGA 208. The tester circuit 212 and computer 214 perform test routines to measure and store various electrical characteristics of the magnetic recording head. The computer 214 can also control the driver circuits of the x-y table 210 and the positioner 100 to move the HGA 208 relative to the rotating disk 202.

In operation, an operator loads an HGA 208 onto the fixture 206. The x-y table 210 then moves the HGA 208 adjacent to the disk 202. The computer 214 performs a series of electrical test on the head of the HGA 208. The transducers of the positioner can be driven to provide a fine movement of the head during the test routine. For example, the positioner 100 can move the HGA 208 during electrical test to determine the offset of a magnetoresistive head. After testing, the x-y table 210 moves the HGA 208 back to the original position so that the operator can replace the part and repeat the process.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. For example, although the positioner 100 shown in FIG. 7 was described as being incorporated into the tester of FIG. 8, it is to be understood that the positioner of FIG. 2 can also be used the system described and shown in FIG. 8.

What is claimed is:

1. A tester for testing a recording head, comprising:

a disk;

a spindle that rotates said disk;

a fixture that supports the recording head;

a first positioner that moves the recording head adjacent to said disk;

a second positioner that is coupled to said first positioner and which moves the recording head relative to said disk, said second positioner including;

a housing that is coupled to said fixture and has a first inner opening;

a first electrical/mechanical transducer that is located within said first inner opening;

at least two first flexure joint inserts that couple said first electrical/mechanical transducer to said housing;

a driver circuit that provides an electric field to said first electrical/mechanical transducer to induce a movement of said housing;

a tester circuit that is coupled to the recording head to test the recording head.

2. The tester as recited in claim 1, wherein said first electrical/mechanical transducer has a longitudinal axis and said first flexure joint inserts each have a pivot point that is offset from the longitudinal axis.

3. The tester as recited in claim 1, wherein said housing is constructed from an aluminum material and said first flexure joint inserts are constructed from a steel material.

4. The tester as recited in claim 3, further comprising an adhesive that is located within a plurality of grooves of said housing to attach said first flexure joint inserts to said housing.

5. The tester as recited in claim 3, wherein each first flexure joint insert includes a coupling portion that is attached to said first electrical/mechanical transducer and adjoined to a base portion by a gimbal, said coupling portion being separated from said base portion by a slit.

6. The tester as recited in claim 1, wherein said housing includes a second opening, and a second electrical/mechanical transducer that is mounted to said housing within said second opening by at least two second flexure joint inserts.

* * * * *